(12) United States Patent
Kubo et al.

(10) Patent No.: US 6,249,682 B1
(45) Date of Patent: Jun. 19, 2001

(54) APPARATUS AND METHOD FOR ESTIMATING SPEED IN MOBILE COMMUNICATION

(75) Inventors: Tokuro Kubo; Morihiko Minowa, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/123,221

(22) Filed: Jul. 27, 1998

(30) Foreign Application Priority Data

Jan. 28, 1998 (JP) .................................................. 10-014701

(51) Int. Cl.[7] ...................................................... H04B 7/00
(52) U.S. Cl. .................. 455/522; 455/226.1; 455/226.2; 455/238.1; 455/277.1; 455/277.2; 375/130
(58) Field of Search ..................................... 455/423, 425, 455/226.1, 226.2, 522, 238.1, 277.1, 277.2, 422, 517, 441, 69, 436; 375/130

(56) References Cited

U.S. PATENT DOCUMENTS

| | | | |
|---|---|---|---|
| 5,367,559 | * | 11/1994 | Kay et al. ................................ 379/60 |
| 5,862,453 | * | 1/1999 | Love et al. ............................... 455/69 |
| 5,896,411 | * | 4/1999 | Ali et al. ................................. 370/200 |
| 6,035,209 | * | 3/2000 | Tiedemann, Jr. et al. ............ 455/522 |
| 6,035,210 | * | 3/2000 | Endo et al. ............................ 455/522 |
| 6,070,086 | * | 5/2000 | Dobrica ................................. 455/522 |
| 6,154,659 | * | 11/2000 | Jalali et al. ............................ 455/522 |

\* cited by examiner

*Primary Examiner*—Nay Maung
*Assistant Examiner*—Temica M. Davis
(74) *Attorney, Agent, or Firm*—Helfgott & Karas, P.C.

(57) ABSTRACT

A speed estimation apparatus detects the change of a transmission power control command transmitted from a receiving station and estimates the moving speed of the receiving station in mobile communications of a spread spectrum system. The speed estimation apparatus also generates a desired signal power by extracting a desired signal from received signals and estimates the moving speed of a corresponding transmitting station using the desired signal power.

19 Claims, 28 Drawing Sheets

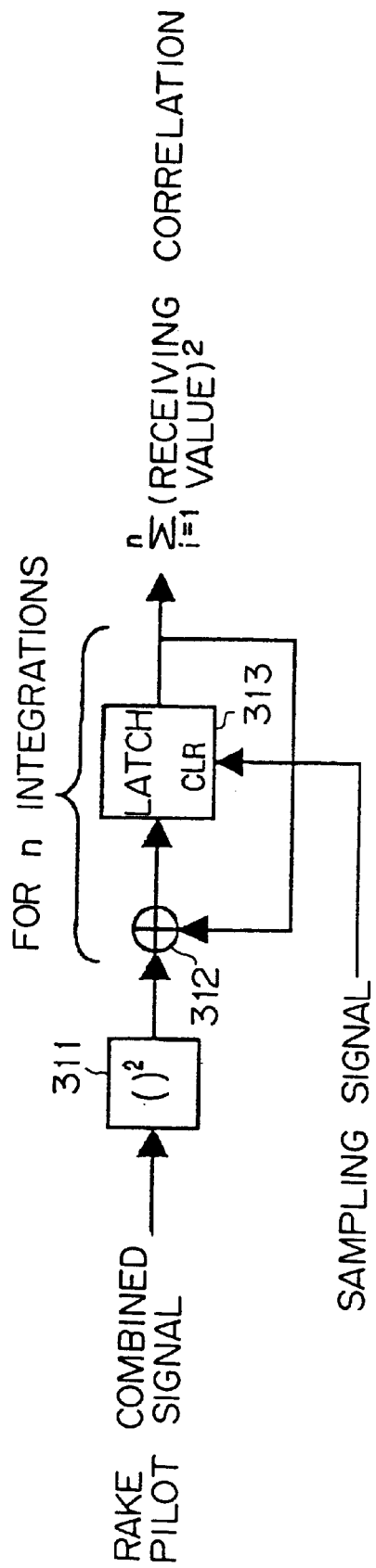
F I G. 24

| ESTIMATED SPEED (km/h) | CONTROL SIGNAL | STAGE |
|---|---|---|
| 0 | 000 | A |
| 0 ~ 40 | 001 | B |
| 40 ~ 80 | 010 | C |
| 80 ~ 120 | 011 | D |
| 120 < | 100 | E |

FIG. 28

APPARATUS AND METHOD FOR ESTIMATING SPEED IN MOBILE COMMUNICATION

BACKGROUND OF THE INVENTION

1. Field of the Invention

The present invention relates to an apparatus and method for estimating the moving speed of opposing stations in mobile communications system.

2. Description of the Related Art

Conventionally, for a channel multiplex method in mobile communications system, a time division multiple access (TDMA) system, frequency division multiple access (FDMA) system, etc. have been used. However, the development of a method with a more efficient use of frequency is desired, and particularly, a direct sequence code division multiple access (DS-CDMA) system is a promising candidate, since a large volume of communications are available with this system.

The DS-CDMA system is one kind of spread spectrum communication system. In this system, on the transmitting side data signals are transmitted with the spread spectrum by using the same frequency for a plurality of channels and multiplying the data signals by an independent spread code with a broad band for each channel, and on the receiving side the data signals for each channel are restored by multiplying received signals by the same spread code. The multiplication of a spread code on the receiving side is called a despread. When this DS-CDMA system is applied to mobile communications, a searcher function, transmission power control function, absolute coherent detection function, etc. are indispensable.

A searcher function means a function for detecting a transmission path and a despread code timing being a timing for performing a despread. A transmission power control function means a function for modifying a transmission power for near-far problem due to the difference in distance between a mobile station and a base station, and an instantaneous fluctuation (fading) due to multi-paths. A coherent detection function means a function for adding a pilot signal to data signals in order to obtain a required bit error rate (BER) in a lower transmission power when transmitting, and performing a coherent detection.

In mobile communications, a stable communication is required in such a variety of dynamically changing environments that a mobile station may transit from a stationary status to a high-speed status, and a mobile station may transit from an urban environment to a suburban environment, etc. Particularly, in a multi-path environment accompanied by reflected waves and delayed waves passing through a plurality of transmission lines, countermeasures are indispensable, since fading (instantaneous value fluctuation) is generated by interference. In the DS-CDMA system too, effective fading countermeasures are desired in connection with each of the above-mentioned functions.

However, there are the following problems in mobile communications using the DS-CDMA system.

Generally speaking, although there are optimal values for parameters of each unit of a communication apparatus against a fading generated during the communication, each parameter is not always set to the optimal value, since the fluctuation speed of the fading changes depending on the moving speed of the mobile station (or fading pitch). Therefore, when the parameters are not optimized, degradation is generated in the receiving characteristics, and thereby the channel capacity is reduced. It is necessary to estimate the moving speed of the mobile station at the base station in order to optimize each parameter.

However, in the DS-CDMA system, since a plurality of channels are multiplexed on the same frequency, unlike a TDMA or FDMA system which are well known as other multiplex methods, it is difficult to estimate the moving speed based on the measurement of the receiving field strength.

SUMMARY OF THE INVENTION

It is an object of the present invention to provide an apparatus and method for estimating the moving speed of a mobile station in mobile communications using a spread spectrum system such as a CDMA system, etc.

The apparatus for estimating a moving speed of the present invention comprises an input unit, a receiver unit, a power composer unit and a speed estimation unit.

In the first aspect of the present invention the apparatus for estimating speed is used in mobile communications for controlling transmission power between a transmitting station and a receiving station. The input unit inputs a transmission power control command transmitted from the receiving station to the transmitting station. The speed estimation unit: estimates the moving speed of the receiving station using the transmission power control command, and outputs a control signal corresponding to the estimated moving speed.

Each of the transmitting station and the receiving station corresponds to a base station or a mobile station, respectively, in mobile communications. For example, The DS-CDMA system controls so that a transmission power may be optimally set against a fading generated due to the difference in distance between the base station and the mobile station and the multi-path transmission line.

In this control a transmission power control command is created on the receiving side, the command is transmitted to the transmitting side. On the transmitting side the transmission power is modified based on the received transmission power control command. Since the value of the transmission power control command changes according to an instantaneous fluctuation such as a fading following the travelling of the mobile station, the moving speed can be estimated if the change is detected. The speed estimation unit estimates the moving speed of the receiving station based on the change or an accumulated value of the transmission power control command.

In the second aspect of the present invention the apparatus for estimating speed is used in mobile communications between a transmitting station and a receiving station. The receiver unit extracts a desired signal from the received signals, and the power composer unit generates the desired signal power from the desired signal. Then, the speed estimation unit estimates the moving speed of the transmitting station using the desired signal power, and outputs a control signal corresponding to the estimated moving speed.

For example, in the DS-CDMA system, received signals are in a state where the spectrum is spread, and a plurality of channels are multiplexed. For this reason, signals experiencing fading from the transmitting station cannot be observed before being despread. However, by despreading the signals the desired signal can be extracted, the influence of the fading can be observed, and thereby the moving speed can be estimated.

The receiver unit despreads the received signals and extracts the desired signal. The power composer unit generates a desired signal power from the extracted signals. Then, the speed estimation unit estimates the moving speed of the transmitting station based on the sample value of the desired signal power.

In fact, since the base station and the mobile station have both the functions of the transmitting station and receiving station, the base and mobile stations can estimate the moving speed of an opposing station using both transmission power control command and desired signal power. The parameters of the communications apparatus can also be set to an optimal value against fading by using a control signal outputted from the speed estimation unit.

BRIEF DESCRIPTION OF THE DRAWINGS

FIG. 24 shows the first configuration example of the power composer unit.

FIG. 28 shows the five ranges of the estimated speed.

DESCRIPTION OF THE PREFERRED EMBODIMENTS

The preferred embodiments of the present invention are described in detail with reference to the drawings.

Figure 1:
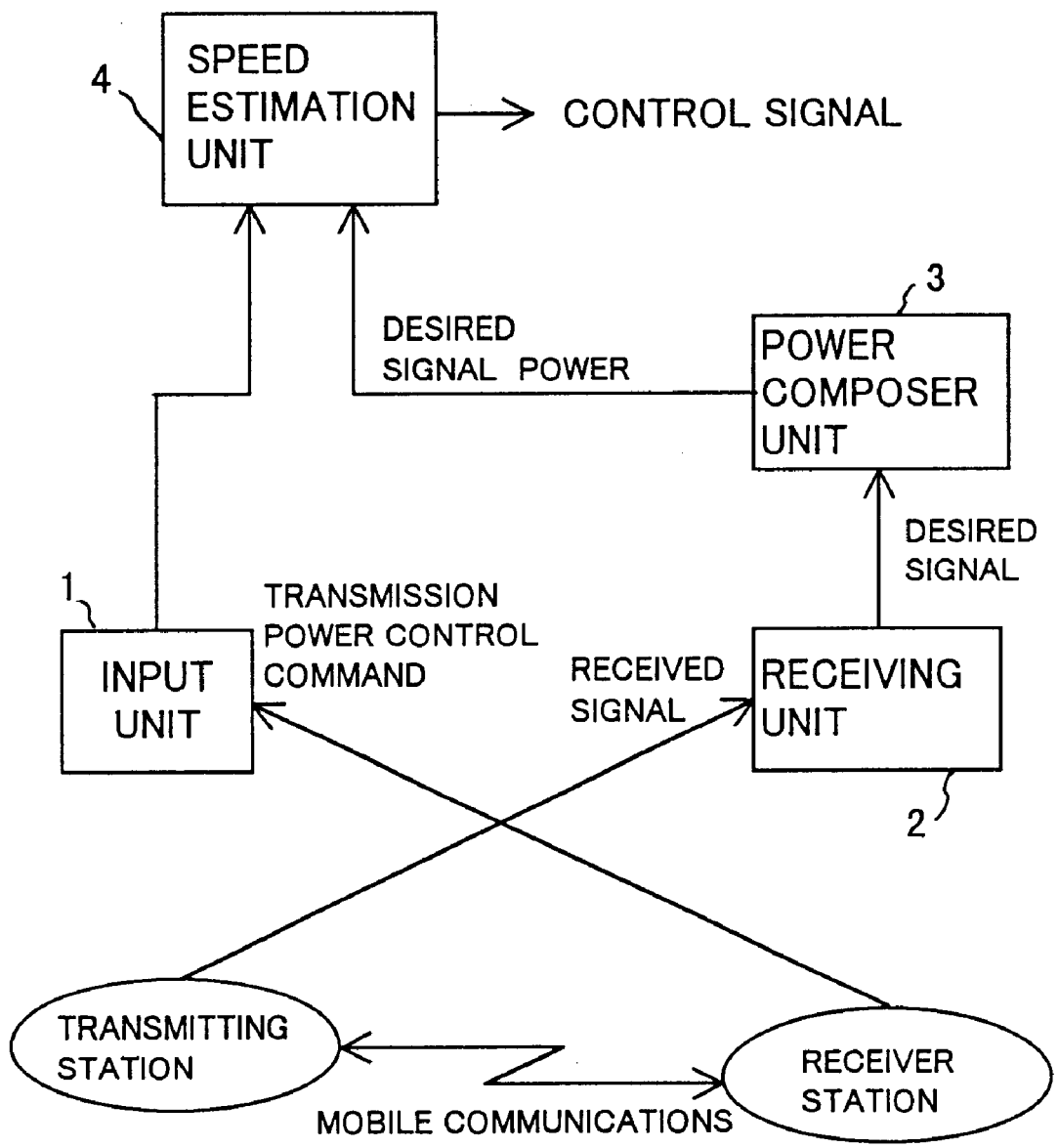
FIG. 1 shows the principle of the speed estimation apparatus of the present invention.

FIG. 1 shows the principle of the speed estimation apparatus of the present invention. The speed estimation apparatus shown in FIG. 1 comprises an input unit 1, a receiver unit 2, a power composer unit 3 and a speed estimation unit 4.

According to the first principle of the present invention, the speed estimation apparatus is used in mobile communications for controlling transmission power between a transmitting station and a receiving station. The input unit 1 inputs a transmission power control command transmitted from the receiving station to the transmitting station. The speed estimation unit 4 estimates the moving speed of the receiving station using the transmission power control command, and outputs a control signal corresponding to the estimated moving speed.

Each of the transmitting station and the 66 receiving station corresponds to a base station or a mobile station, respectively, in mobile communications. For example, The DS-CDMA system controls so that transmission power may be optimally set against fading generated due to the difference in distance between the base station and the mobile station and the multi-path transmission line.

In this control, on the receiving side, a transmission power control command is created, and the command is transmitted to the transmitting side. On the transmitting side the transmission power is modified based on the received transmission power control command. Since the value of the transmission power control command changes according to cm instantaneous fluctuation such as fading following the travelling of the mobile station, the moving speed can be estimated, if a change is detected. The speed estimation unit estimates the moving speed of the receiving station based on the change or an accumulated value of the transmission power control command.

According to the second principle of the present invention, the speed estimation apparatus is used in mobile communications between a transmitting station and a receiving station. The receiver unit 2 extracts a desired signal from received signals, and the power composer unit 3 generates a desired signal power from the desired signal. Then, the speed estimation unit 4 estimates the moving speed of the transmitting station using the desired signal power, and outputs a control signal corresponding to the estimated moving speed.

For example, in the DS-CDMA system, received signals are in a state where the spectrum is spread, and a plurality of channels are multiplexed. For this reason, signals affected by fading from the transmitting station cannot be observed before being despread. However, the desired signal can be extracted, the influence of fading can be observed, and thereby the moving speed can be estimated by despreading the signals.

The receiver unit 2 despreads received signals and extracts the desired signal. The power composer unit 3 generates a desired signal power from the extracted signals. Then, the speed estimation unit 4 estimates the moving speed of the transmitting station based on the sample value of the desired signal power.

In fact, since the base station and the mobile station have the functions of both transmitting and receiving stations, the base and mobile stations can estimate the moving speed of an opposing station using both transmission power control command and desired signal power. The parameters of the communications apparatus can also be set to an optimal value against fading by using a control signal outputted from the speed estimation unit 4.

Figure 4:
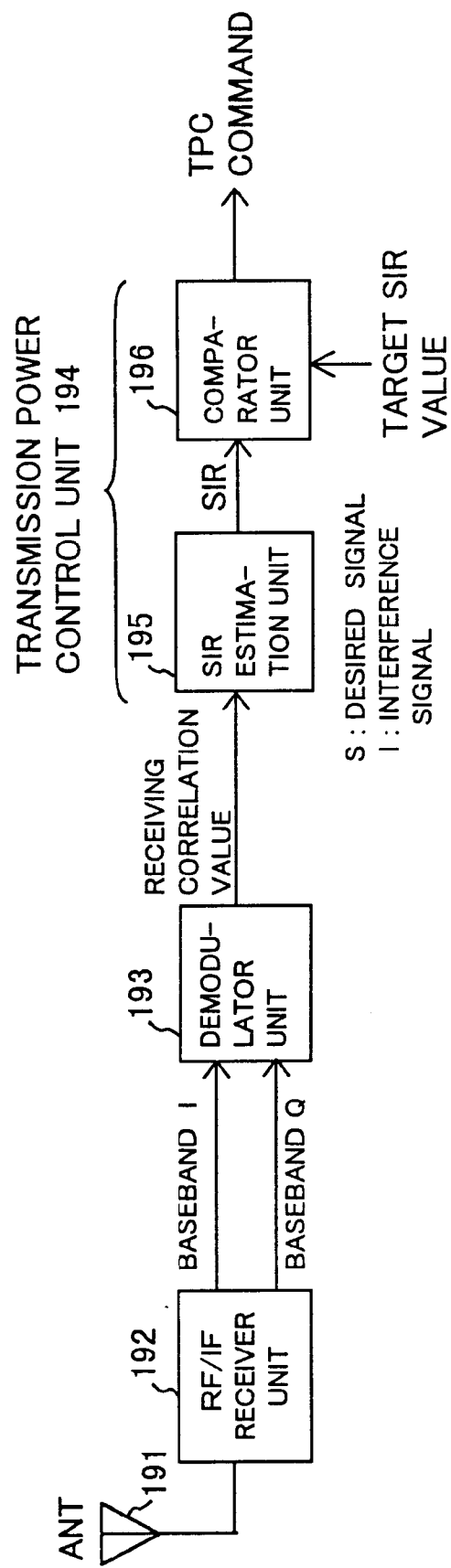
FIG. 4 shows the configuration of the transmission power control unit of the receiver.
Figure 5:
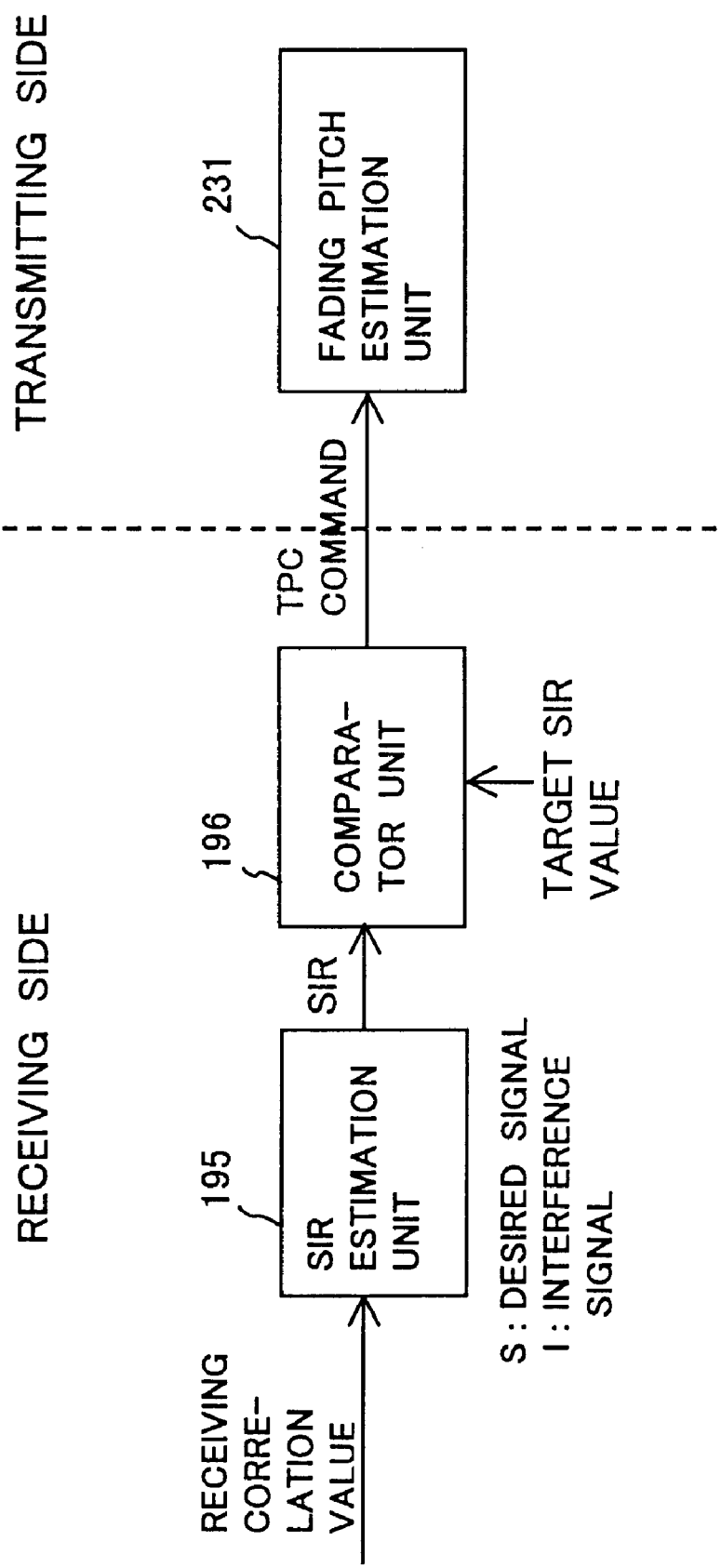
FIG. 5 shows speed estimation using a TPC command.
Figure 13:
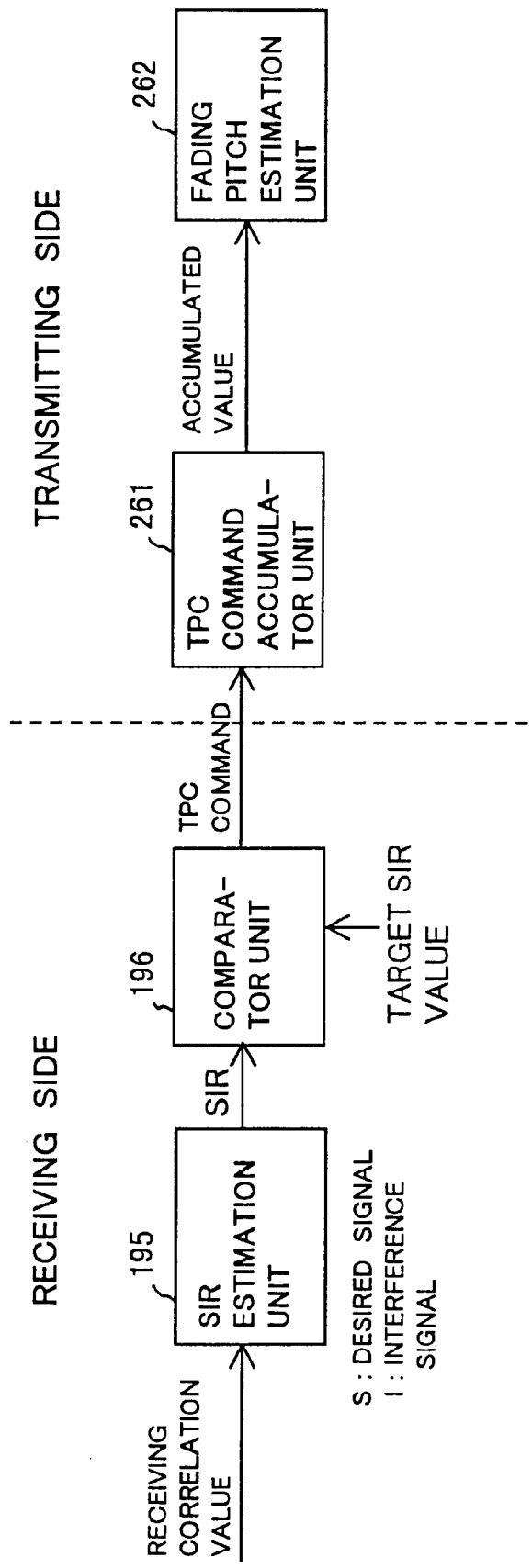
FIG. 13 shows speed estimation using the accumulated value of a TPC command.
Figure 18:
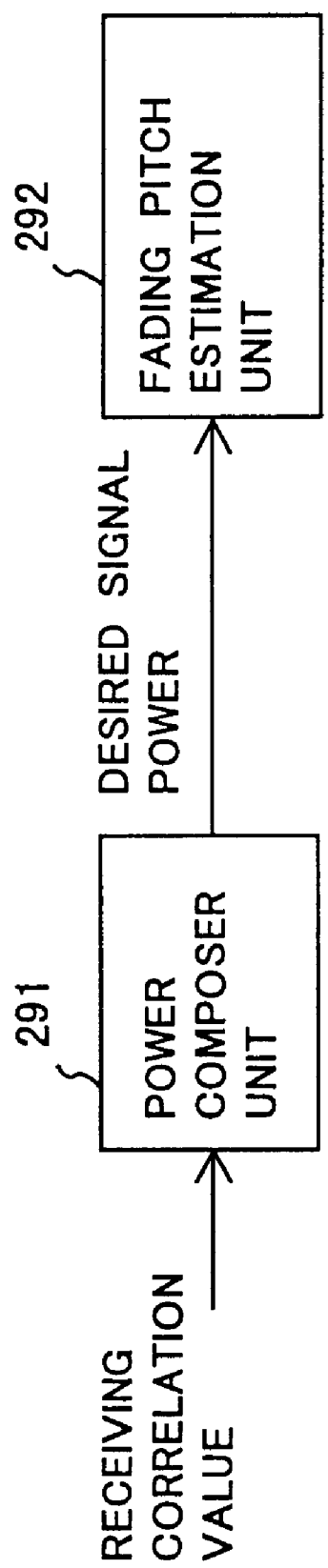
FIG. 18 shows speed estimation using a desired signal power.

For example, the input unit 1 shown in FIG. 1 corresponds to a TPC command accumulation unit 261 shown in FIG. 13, the receiver unit 2 shown in FIG. 1 corresponds to a receiver unit 192 and a demodulator unit 193 shown in FIG. 4, the power composer unit 3 shown in FIG. 1 corresponds to a power composer unit 291 shown in FIG. 18, and the speed estimation unit 4 shown in FIG. 1 corresponds to a fading pitch estimation unit 231 shown in FIG. 5, a fading pitch estimation unit 262 shown in FIG. 13 and a fading pitch estimation unit 292 shown in FIG. 18.

In this embodiment a moving speed is estimated utilizing a TPC command used in the transmission power control (TPC) of a DS-CDMA system and the receiving correlation value of a received wave. If the moving speed is obtained, the values of the parameters for a searcher, transmission power control unit, and phase estimation unit, at the time of coherent detection can be set optimally against the generated fading.

Figure 2:
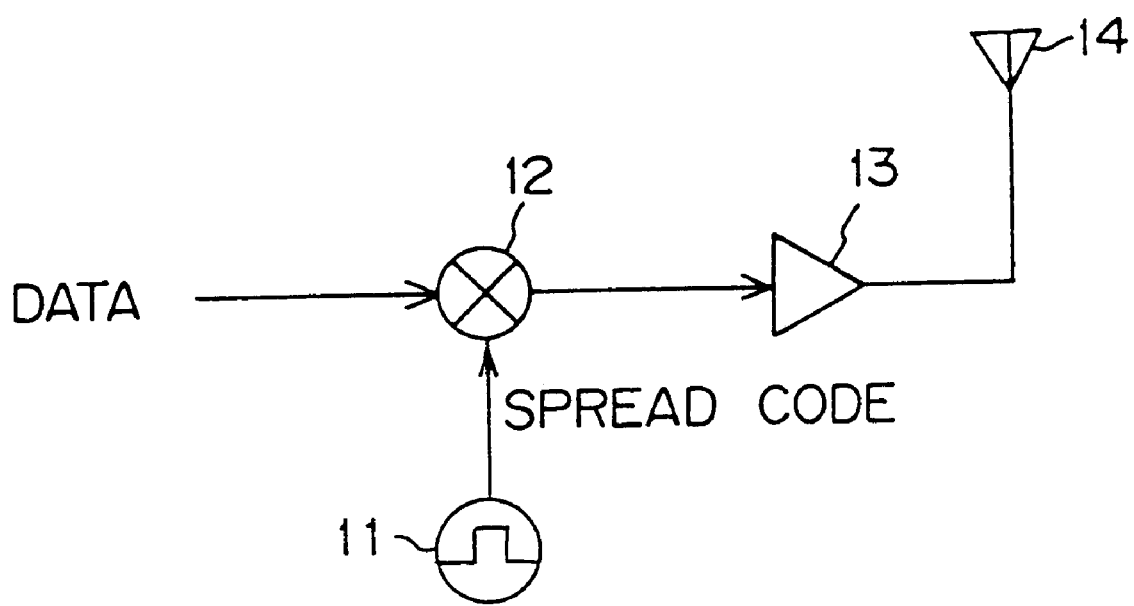
FIG. 2 shows the principle of the transmitter.
Figure 3:
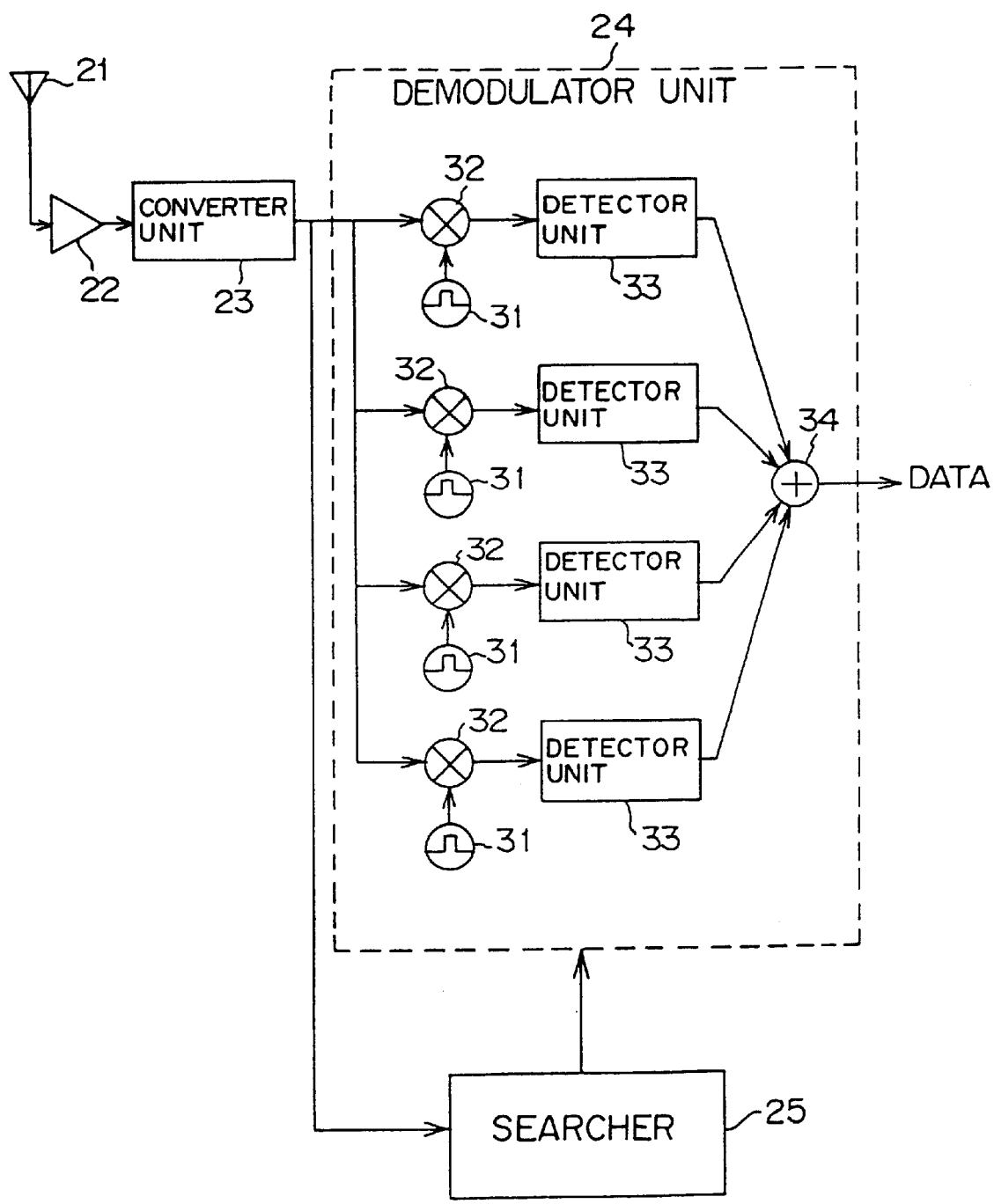
FIG. 3 shows the principle of the receiver.

First, the communications apparatus of a DS-CDMA system is described below. FIG. 2 and FIG. 3 show the principles of the transmitter and the receiver, respectively, of the DS-CDMA system.

In FIG. 2 data to be transmitted are put on a carrier wave and are multiplied by a spread code from a code generator 11 using a multiplier 12, pass through an amplifier 13, and are transmitted from an antenna 14. For the logic of the multiplier 12 any logic such as an exclusive-OR (EXOR), etc. can be used.

In FIG. 3 received signals inputted from an antenna 21 pass through an amplifier 22, are converted to baseband signals (digital signals) by a converter unit 23, and are restored to the original data by a demodulator unit 24.

The demodulator unit 24 comprises a plurality of sets consisting of a code generator 31, a multiplier 32 and detector unit 33. Each code generator 31 generates a despread code with a different timing. For the despread code usually, the same code as a spread code used for transmission is used. The multiplier 32 multiplies the input signals by the despread code, and restores the spectrum to the original band. The detector unit 33 detects the despread signals. An adder 34 composes and outputs the outputs of the detector units 33.

A searcher 25 is provided in order to match the timings of a spread on the transmitting side and et despread on the receiving side. The searcher 25 detects the signal delay of each path in a multi-path environment from the output signals of the converter unit 23, and controls the timing of each code generator 31 so that despreads are performed with a timing in accordance with each path. In this way, data composed of signals passing through a plurality of paths are outputted from the demodulator unit 24.

Next, the configuration for estimating a moving speed is described below. Although the description is made here mainly assuming to estimate the moving speed of a mobile station at a base station, the mobile station can also be provided with a similar configuration. In that case, a relative moving speed to the mobile station of the base station can be estimated.

There are two estimation methods of the moving speed. That is, one is a method using a TPC command from a mobile station, and the other is a method using a desired signal power. First, the estimation method using a TPC command is described below. In a DS-CDMA system, for example, transmission power control as shown in FIG. 4 is performed in the transmission power control unit on the receiving side for the fading generated due to the difference in distance between the base and mobile stations, and a multi-path transmission line.

In FIG. 4 an antenna 191 corresponds to an antenna 21 shown in FIG. 3, a receiver unit 192 corresponds to an amplifier 22 and a converter unit 23 shown in FIG. 3, and a demodulator unit 193 corresponds to a demodulator unit 24 shown in FIG. 3. The demodulator unit 193 performs the despreading and rake combining of baseband signals from the receiver unit 192, and outputs a receiving correlation value. A receiving correlation value means a signal after being despread.

The transmission power control unit 194 comprises an SIR estimation unit 195 and a comparator unit 196. The SIR estimation unit 195 estimates the signal-to-interference ratio (SIR) from the receiving correlation value, and the comparator unit 196 compares the estimated SIR value with a target SIR value. If the estimated SIR value is greater than the target SIR value, the comparator unit 196 creates a TPC command to decrease the transmission power. If the estimated SIR value is smaller than the target SIR value, the comparator unit 196 creates a TPC command to increase the transmission power. Then, the transmission power control unit 194 transmits the TPC command to the transmitting side, and controls the transmission power.

When a transmission power control unit (not shown in FIG. 4) provided on the transmitting side receives a TPC command from the receiving side, the transmission power control unit increases or decreases the transmission power value according to the TPC command. Thus, the transmission power of the transmission side can be controlled so that the SIR value of the receiving side may be optimized.

Since the TPC command changes according to an instantaneous fluctuation such as fading, etc., the moving speed can be estimated, only if the change rate of the TPC command is detected. However, since in the case of an extremely high-speed fading which the TPC command cannot follow, the change rate is saturated and becomes constant when the moving speed exceeds a certain level. The point where the change rate of a TPC command is saturated and becomes constant depends on both the variable width and the variable time width of the TPC command.

FIG. 5 shows the configuration for estimating a moving speed using a TPC command generated in the above-mentioned system for controlling the transmission power. In FIG. 5 a fading pitch estimation unit 231 is provided on the transmitting side, and the moving speed of the receiving side is estimated by detecting the change of an inputted TPC command.

For example, if a TPC command to increase the transmission power and a TPC command to decrease the transmission power are indicated by "+1" and "−1", respectively, the fading pitch estimation unit 231 compares two consecutive TPC commands, counts the frequency of the cases where data with the same code continue twice, and the moving speed is estimated based on the count value. Generally speaking, when the moving speed is low, the code of the TPC command does not often change. When the moving speed is high, the code is often reversed. Accordingly, when the moving speed becomes low, the frequency of the cases where data with the same code continues tends to increase. When the moving speed becomes high, this frequency tends to decrease.

Figure 6:
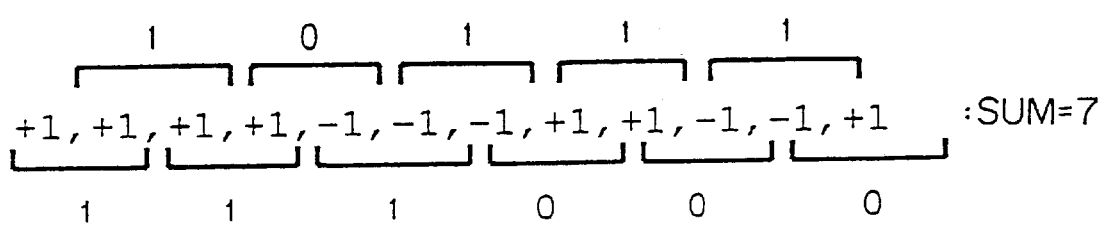
FIG. 6 shows the first count result of a TPC command.
Figure 7:
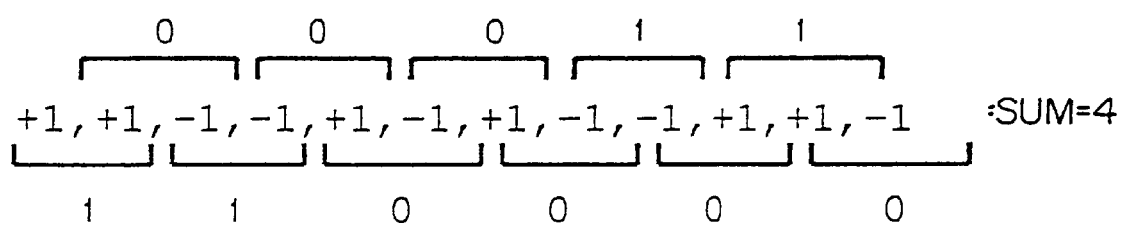
FIG. 7 shows the second count result of a TPC command.

For example, in the TPC command strings shown in FIG. 6 and FIG. 7, the count values (SUM) are seven and four, respectively. Accordingly, it is estimated that a moving speed in a state shown in FIG. 7 is higher than the moving speed in a state shown in FIG. 6. A moving speed can be estimated at a plurality of stages by dividing the range of the count value. A moving speed can also be represented as an appropriate function of the count value.

Figure 8:
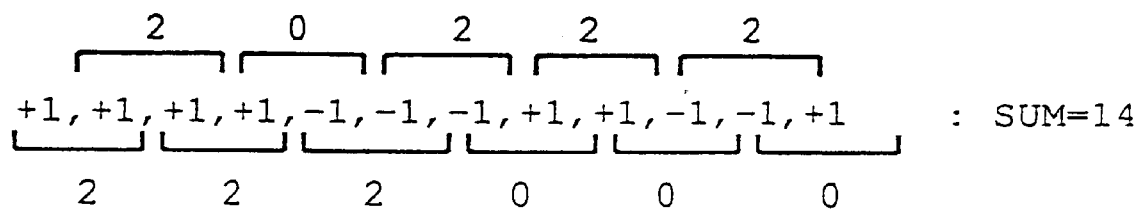
FIG. 8 shows the third count result of a TPC command.
Figure 9:
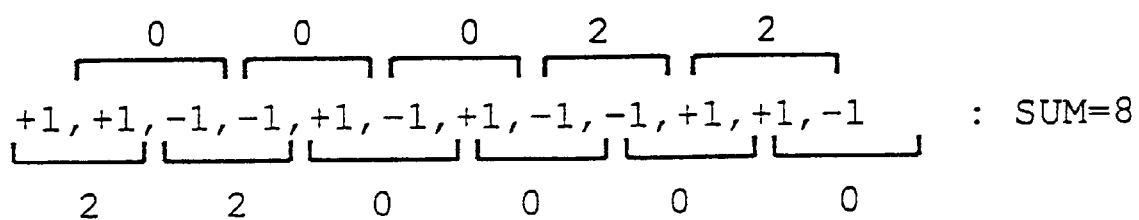
FIG. 9 shows the fourth count result of a TPC command.

FIGS. 8 and 9 show other count methods of a TPC command string shown in FIGS. 6 and 7, respectively. Even if this count method is adopted, a moving speed can be estimated in the same way as described above.

Figure 10:
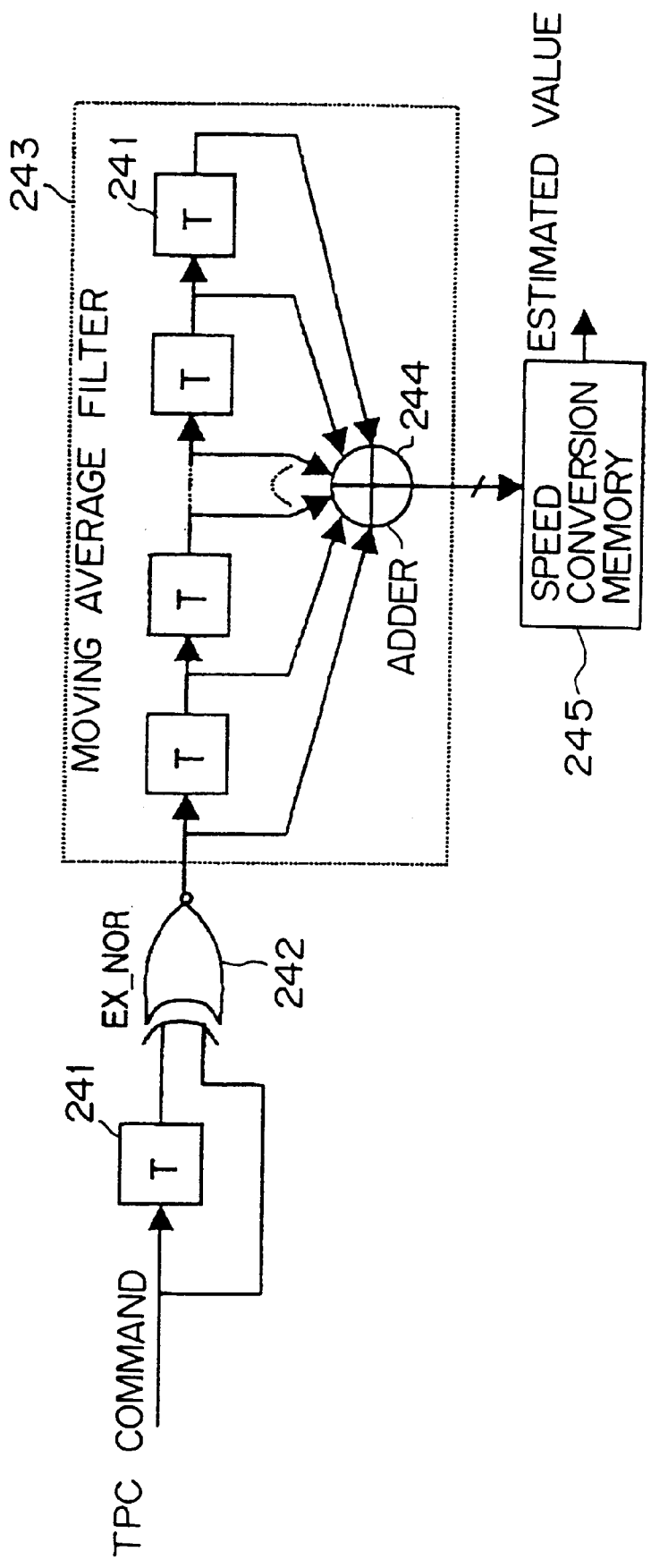
FIG. 10 shows the first configuration example of the fading pitch estimation unit.

FIG. 10 shows a configuration example of the fading pitch estimation unit 231 performing count operations shown in FIGS. 6 and 7. The configuration shown in FIG. 10 comprises a delay circuit 241, an EX_NOR gate 242, a moving average filter 243 and a speed conversion memory 245.

The delay circuit 241 delays an inputted TPC command by one sample time, and outputs the TPC command. The EX_NOR gate 242 performs the exclusive-NOR operation on the inputted TPC command and the output of the delay circuit 241. Thus, the exclusive-NOR signal of the inputted TPC command and the TPC command one sample before is outputted. Accordingly, if the values of two consecutive TPC commands are the same, a logic "1" is outputted. If not, a logic "0" is outputted.

The moving average filter 243 comprises a plurality of delay circuits 241 and an adder 244. The moving average filter 243 adds the outputs of the EX_NOR gate 242 for a certain time, and outputs the result of the addition as a count value. The speed conversion memory 245 stores a conversion table for converting the count value inputted from the moving average filter 243 to a fading pitch, and outputs the estimated value of the fading pitch using the conversion table.

Figure 11:
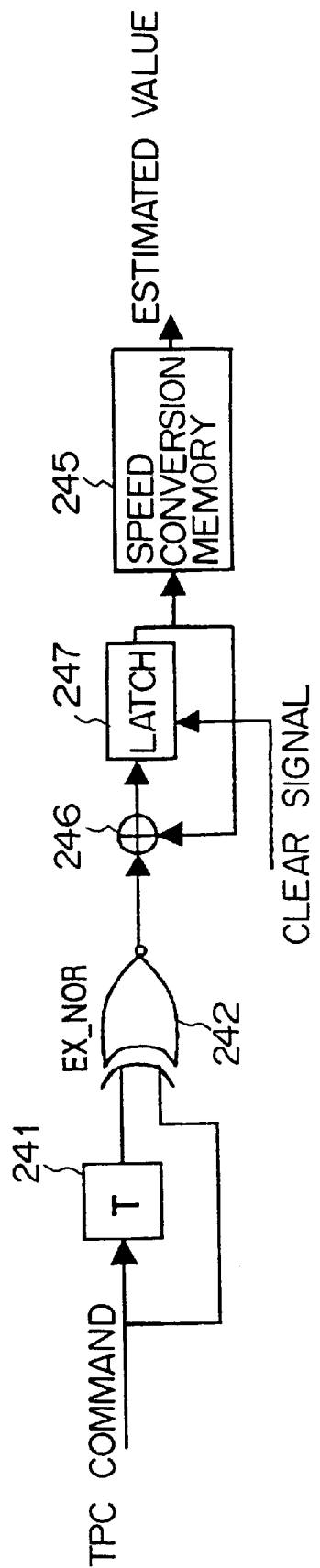
FIG. 11 shows the second configuration example of the fading pitch estimation unit.

The configuration shown in FIG. 11 comprises an integrator consisting of an adder 246 and a latch circuit 247 instead of the moving average filter 243 shown in FIG. 10. The adder 246 repeats a certain number of times an operation for adding the output of the EX_NOR gate 242 to the count value stored in the latch circuit 247, and the latch circuit 247 outputs the count value to a speed conversion memory 245. Thus, the estimated value of the fading pitch is outputted from the speed average conversion memory 245.

Figure 12:
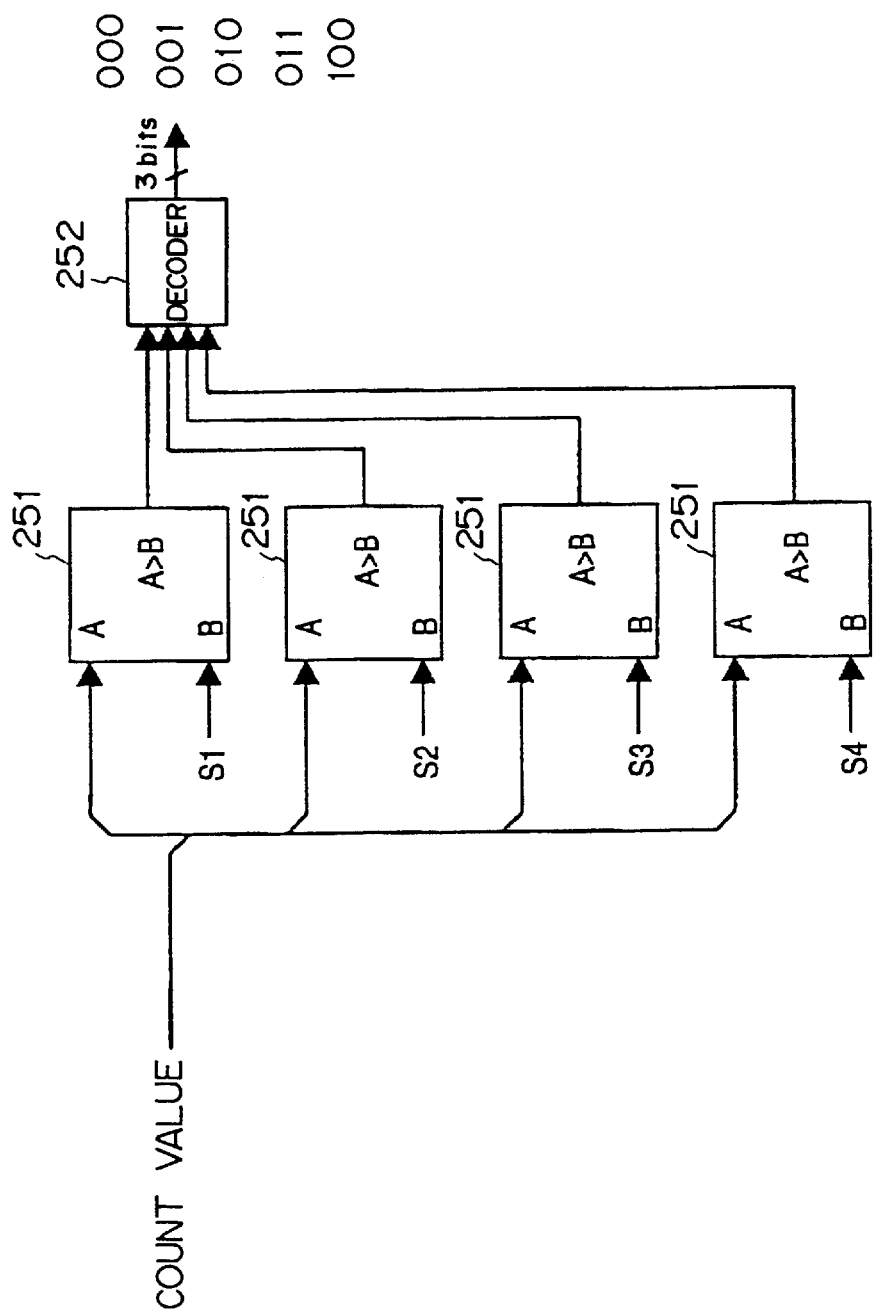
FIG. 12 shows the circuit for generating a fading pitch from the count value.

The count value can also be converted to a fading pitch by adopting such a circuit as shown in FIG. 12 instead of the speed conversion memory 245. The circuit shown in FIG. 12 comprises four comparators 251 and a decoder 252.

Each comparator 251 compares an inputted count value A with given thresholds B (S1, S2, S3 and S4). If A>B, the comparator 251 outputs a logic "1", and if not, the comparator 251 outputs a logic "0". It is assumed that the thresholds S1, S2, S3 and S4 are determined by the relationship between a count value and a fading pitch beforehand, and that S1<S2<S3<S4.

The decoder 252 generates a signal corresponding to the fading pitch from the output of each comparator 251. For example, the output of the decoder 252 is three bits. When a count value $\leq$S1, S1< a count value $\leq$S2, S2< a count value $\leq$S3, S3< a count value $\leq$S4 and S4< a count value, the outputs become "100", "011", "010", "001" and "000", respectively. Accordingly, the greater the count value becomes, the smaller the output of the decoder 252 becomes.

In the speed estimation method like this, when the transmission frequencies of TPC commands differ due to the differences in system, the frequency of the case where data with the same code continues twice is not necessarily optimal for speed estimation. For this reason, this method is generalized, the frequency of the case where data with the same code continues N times is counted, and a count value optimal for the system is used for the estimation. It is better that the greater the transmission frequency of a TPC command is, the greater the value of N is made.

Next, FIG. 13 shows a configuration for estimating a moving speed using the accumulated value of TPC commands. A TPC command accumulator unit 261 shown in FIG. 13 is provided in the transmission power control unit of the transmitting side. The values of TPC commands inputted in succession are added in order, and accumulated values are obtained from the result of the addition. On the transmitting side the transmission power value is modified according to this accumulated value. A fading pitch estimation unit 262 receives the accumulated value from the TPC command accumulator unit 261, and estimates the moving speed.

Figure 14:
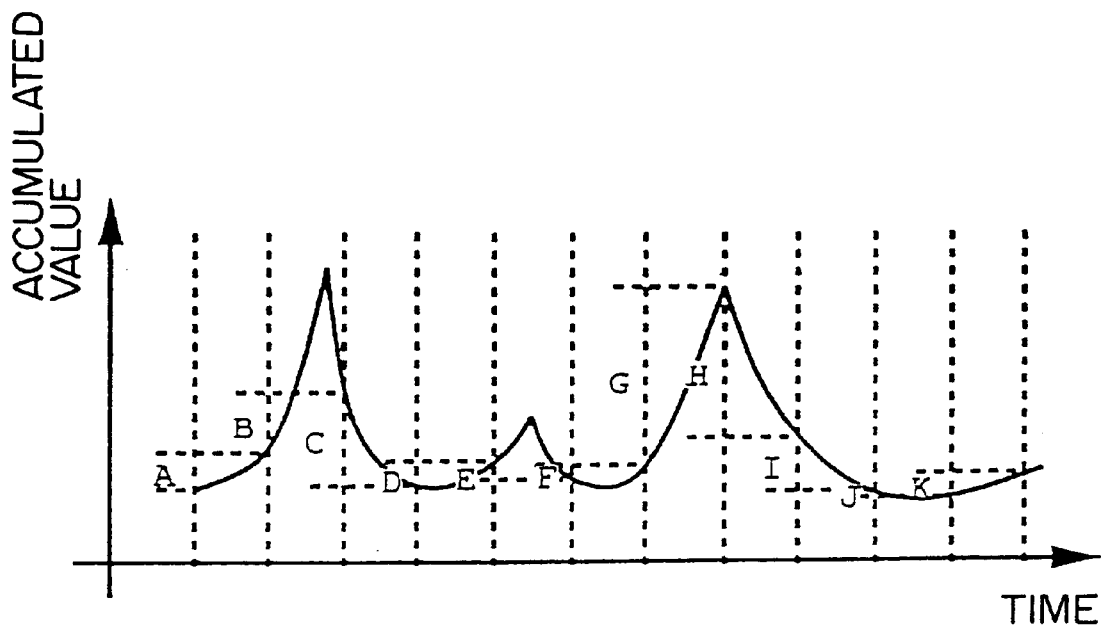
FIG. 14 shows the sampling of the accumulated values.

As shown in FIG. 14, the fading pitch estimation unit 262 samples the accumulated value of the TPC command at certain sampling intervals, adds the absolute values of the difference between two consecutive sample values (A, B, C, D, E, F, G, H, I, J and K) for a certain time, and estimates the moving speed from the sum.

The higher the moving speed is, the greater this added value becomes, since the higher the moving speed is, the more rapidly the accumulated value increases or decreases. The lower the moving speed is, the smaller this added value becomes, since the lower the moving speed is, the more slowly the accumulated value increases or decreases. Accordingly, a moving speed can be estimated at a plurality of stages by dividing the range of the sum of the differences between sample values. A moving speed can also be represented as an appropriate function of the sum.

Figure 15:
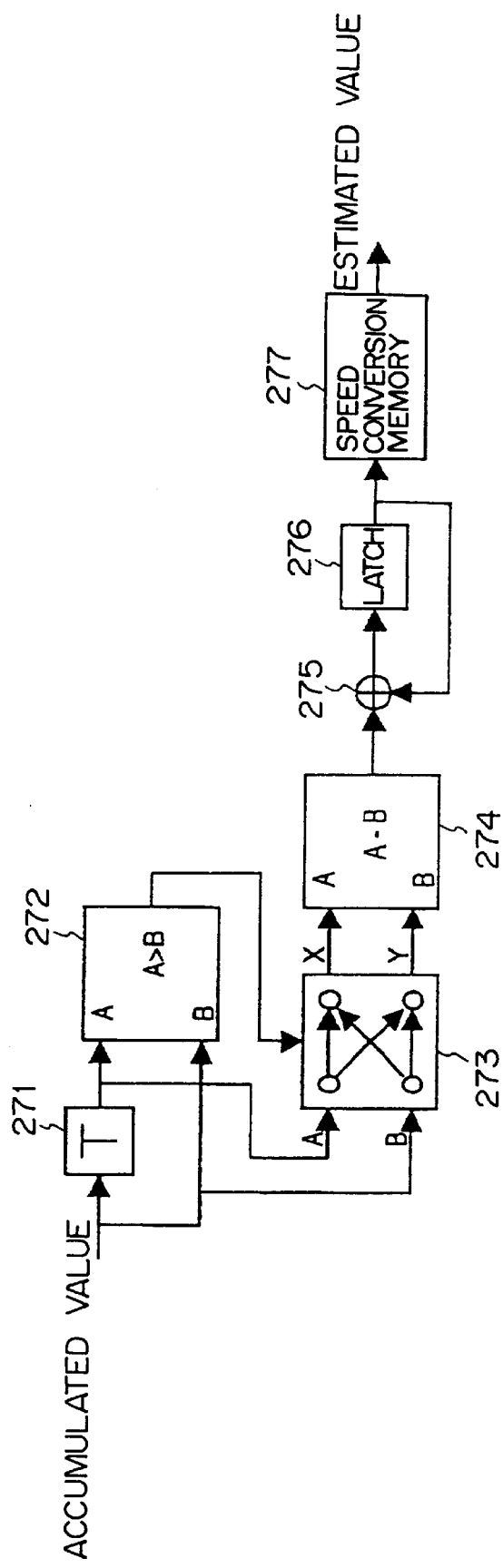
FIG. 15 shows the third configuration example of the fading pitch estimation unit.

FIG. 15 shows a configuration example of the fading pitch estimation unit 262 for performing an operation like this. The configuration shown in FIG. 15 comprises a delay circuit 271, a comparator 272, a converter circuit 273, a subtracter 274, an adder 275, a latch circuit 276 and a speed conversion memory 277.

The delay circuit 271 delays an inputted accumulated value by one sample time, and outputs the accumulated value. The comparator 272 compares the inputted accumulated value B with the output A of the delay circuit 271. If A>B, the comparator 272 outputs a logic "1", and if not, the comparator 272 outputs a logic "0".

The converter circuit 273 is controlled by the output of the comparator 272. If the output of the comparator 272 is a logic "1", the converter circuit 273 outputs inputs A and B from outputs X and Y, respectively. If the output of the comparator 272 is a logic "0", the converter circuit 273 outputs inputs A and B from outputs Y and X, respectively. Accordingly, if the inputted accumulated value B is greater than the accumulated value A one sample before, X=B and Y=A, and if the inputted accumulated value B is smaller than the accumulated value A one sample before, X=A and Y=B.

The subtracter 274 subtracts the output Y from the output X of the converter circuit 273, and outputs the balance. Since the output of the converter circuit 273 is always X$\geq$Y, the output of the subtracter 274 always becomes 0 or positive. This output corresponds to the absolute value of the difference between an inputted accumulated value and an accumulated value one sample before.

The adder 275 repeats an operation for adding the output of the subtracter 274 to a sum stored by the latch circuit 276 a certain number of times, and the latch circuit 276 outputs the sum to the speed conversion memory 277. Thus, the estimated value of a fading pitch is outputted from the speed conversion memory 277. Instead of the speed conversion memory 277, the sum can also be converted to an estimated value using such a circuit as shown in FIG. 12.

Alternatively, when adding the differences between sample values for a certain period of time, the moving average of these values can be measured, and a moving speed can be estimated from the average value. More precise fluctuation of the moving speed can be estimated by measuring the moving average accurately.

Figure 16:
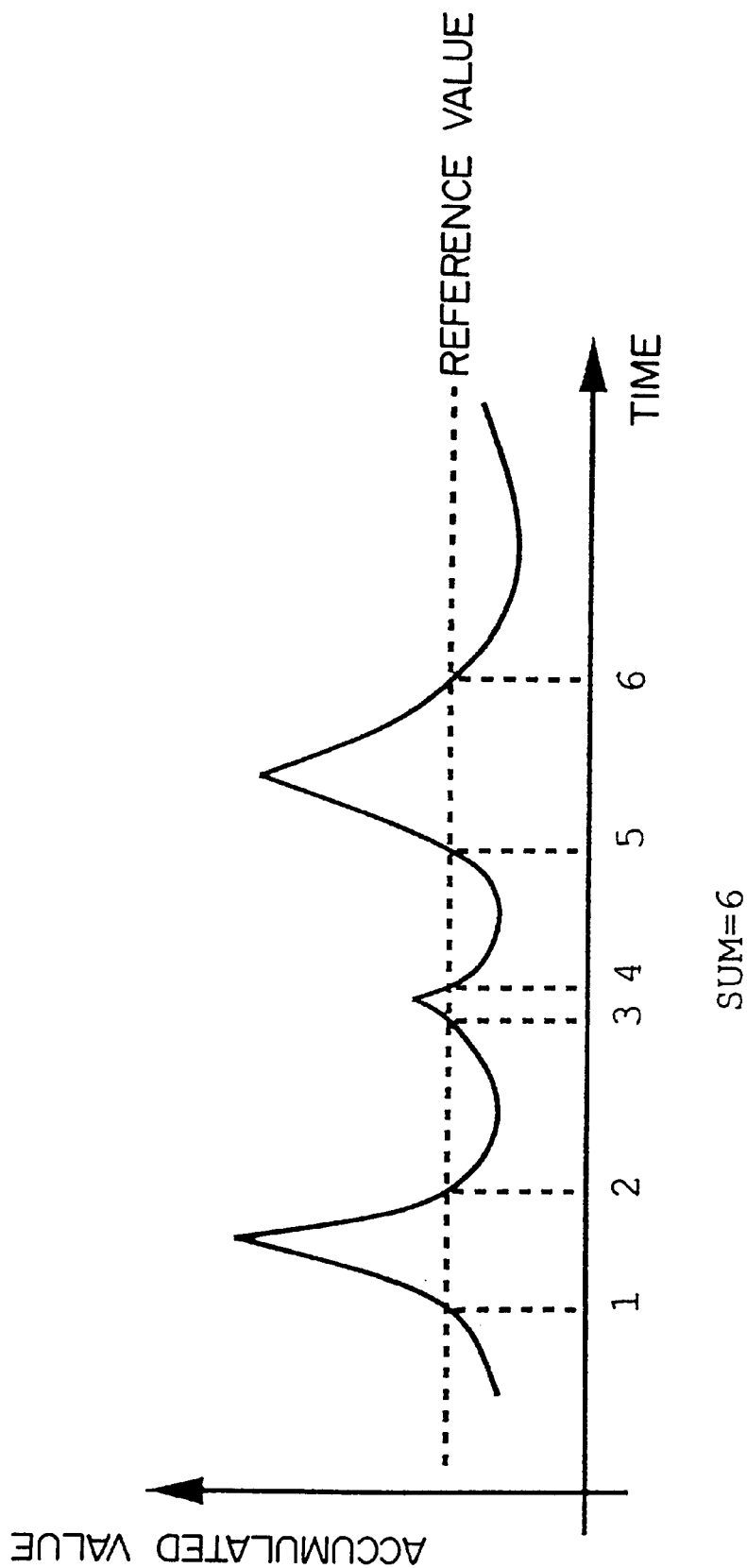
FIG. 16 shows the reference value of the accumulated values of a TPC command.

As shown in FIG. 16, by making the fading pitch estimation unit 262 count the frequency of the cases where the accumulated value of a TPC command crosses a certain reference value, a moving speed can also be estimated from the count value (SUM). An accumulated value crossing the reference value means that the accumulated value becomes greater than the reference value or that the accumulated value becomes smaller than the reference value. The higher the moving speed is, the greater the count value becomes. The lower the moving speed is, the smaller the count value becomes. Accordingly, by using this count value, a moving speed can be estimated in the same way as the differences between sample values are added.

Figure 17:
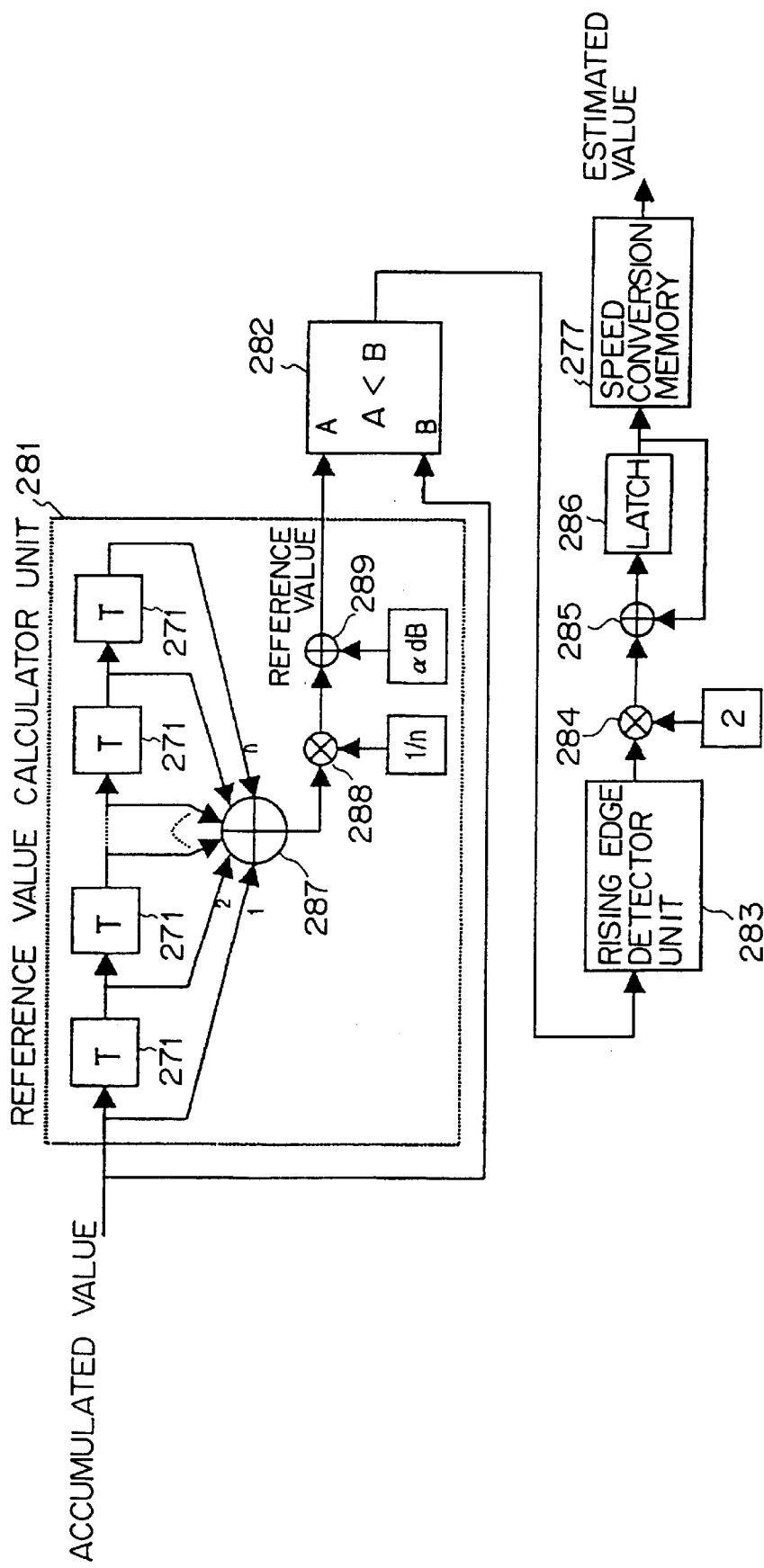
FIG. 17 shows the fourth configuration example of the fading pitch estimation unit.

FIG. 17 shows a configuration example of the fading pitch estimation unit 262 for performing an operation like this. The configuration shown in FIG. 17 comprises a reference value calculator unit 281, a comparator 282, a rising edge detector unit 283, a multiplier 284, an adder 285, a latch circuit 286 and a speed conversion memory 277.

The reference value calculator unit 281 further comprises (n−1) delay circuits 271, an adder 287, a multiplier 288 and an adder 289, and calculates a reference value from the average of n accumulated values. The adder 287 adds an inputted accumulated value and the outputs of (n−1) delay circuits 271, and the multiplier 288 multiplies the result of the addition by 1/n. The adder 289 adds a certain value α to the result of the multiplication, and creates a reference value.

The comparator 282 compares the reference value A from the reference value calculator unit 281 with the inputted accumulated value B. If A<B, the comparator 282 outputs a logic "1", and if not, the comparator 282 outputs a logic "0". When the output of the comparator 282 changes from a logic "0" to a logic "1", the rising edge detector unit 283 outputs a logic "1", and the multiplier 284 multiplies the output of the rising edge detector unit 283 by 2.

The adder 285 repeats an operation for adding the output of the multiplier 284 to a count value stored by the latch circuit 286 within a certain number of times, and the latch circuit 286 outputs the count value to the speed conversion memory 277. Thus, double the frequency of the cases where the accumulated value exceeds the reference value for a certain number of times is outputted as a count value, and this count value corresponds to the frequency of the cases where the accumulated values cross the reference value.

The speed conversion memory 277 outputs the estimated value of a fading pitch corresponding to an inputted count value. The count value can also be converted to an estimated value using such a circuit as shown in FIG. 12 instead of the speed conversion memory 277.

By measuring the moving average of the count values for a certain period of time when counting the crossing frequency, the moving speed can also be estimated from the average. More precise fluctuation of the moving speed can be estimated by measuring the moving average accurately.

Although all the methods described above are the estimation methods of a moving speed using a TPC command, there is also another method using a desired signal power obtained from a receiving correlation value. In a DS-CDMA system, received signals before being despread are in a state where the spectrum is spread, and a plurality of channels are multiplexed. For this reason, signals affected by fading from a target mobile station cannot be observed before being despread. However, a target desired signal can be extracted by despreading the signals, the fading can be observed, and thereby the moving speed can be estimated.

FIG. 18 shows the configuration for estimating a moving speed using a desired signal power. A power composer unit 291 composes a desired signal power using a receiving correlation value corresponding to the output of the demodulator 24 shown in FIG. 3. A fading pitch estimation unit 292 estimates a moving speed based on the composed desired signal power.

Figure 19:
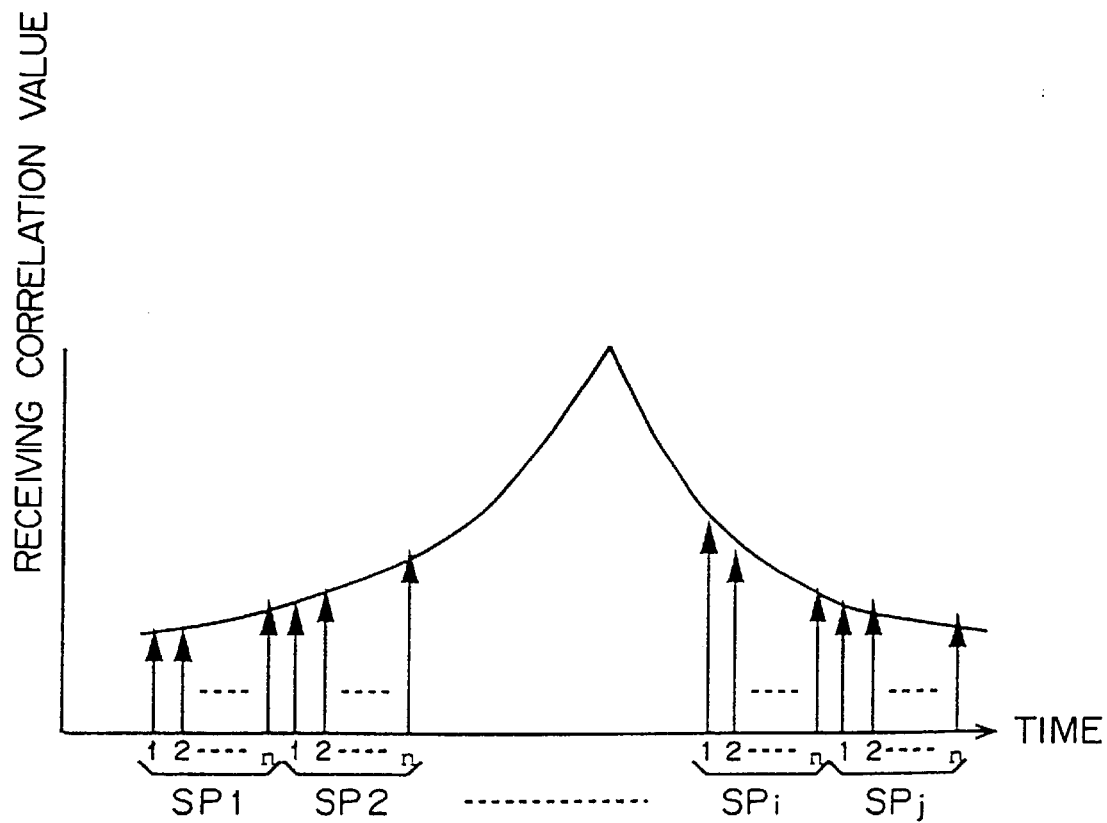
FIG. 19 shows the sampling of receiving correlation values.

As shown in FIG. 19, the fading pitch estimation unit 292 measures the receiving correlation value, and samples desired signal powers every certain period of time. Each of sample values (SP1, SP2, . . . , SPi, SPj) of the desired signal power is generated from n consecutive receiving correlation values (1, 2, . . . , n).

Figure 20:
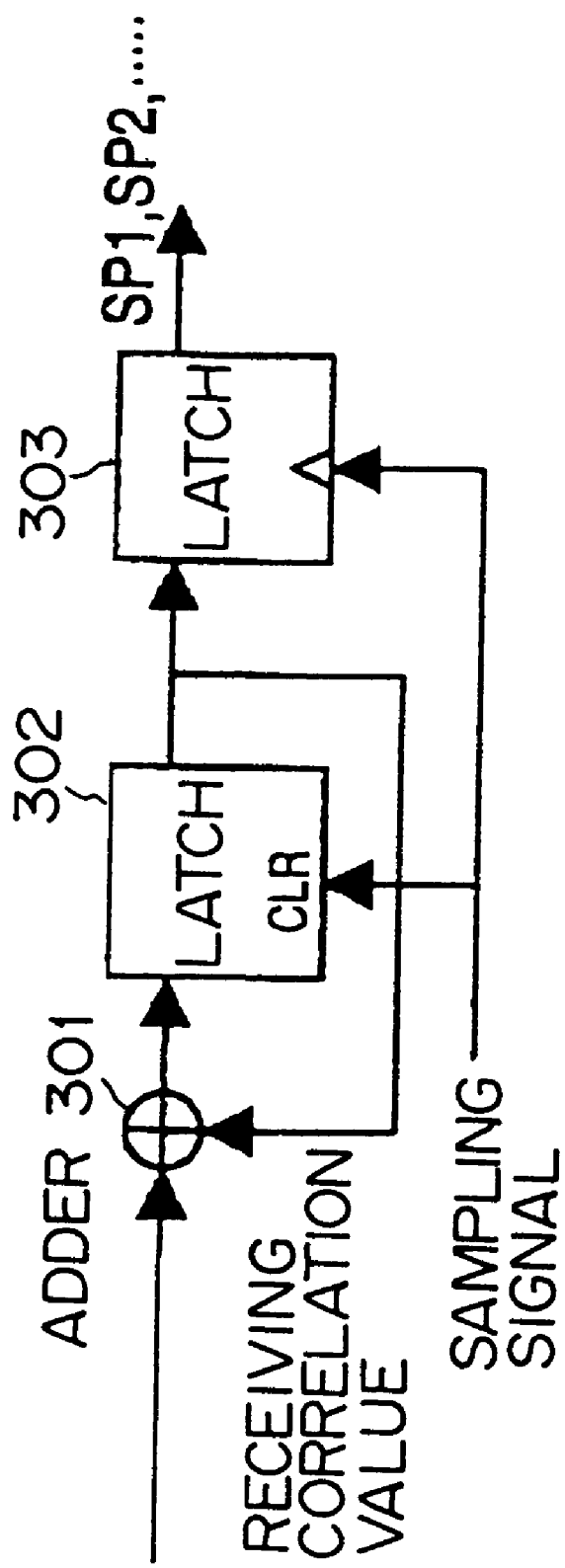
FIG. 20 shows the sampling circuit.

FIG. 20 shows a configuration of the circuit for performing a sampling operation like this. The sampling circuit shown in FIG. 20 comprises an adder 301 and latch circuits 302 and 303, and creates the sample value of a desired signal power.

The adder 301 and the latch circuit 302 integrate n consecutive receiving correlation values, and the latch circuit 302 is cleared each one sample time by a sampling signal. The latch circuit 303 latches the output of the latch circuit 302 for each one sample time according to a sampling signal, and outputs a sample value. According to a circuit like this the sum of n receiving correlation values inputted for one sample time is outputted as a sample value.

When performing the coherent detection of signals, phase estimation is needed in the detector unit 33 shown in FIG. 3. When using an inserted type synchronous detector circuit, the phase is estimated using a pilot signal being a known signal inserted between data signals. For a method for generating a desired signal power from the receiving correlation value of a signal including a pilot signal, for example, three methods shown in FIGS. 21, 22 and 23 can be considered.

Figure 21:
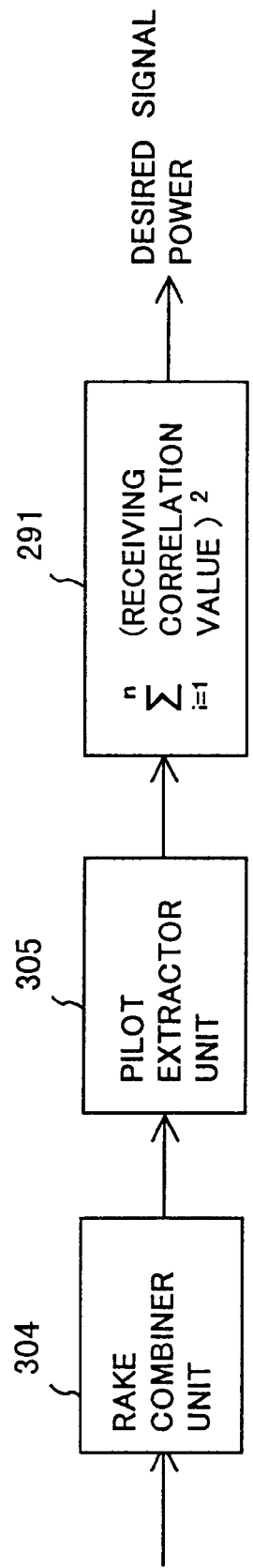
FIG. 21 shows the first power composition.

In FIG. 21, a rake combiner unit 304 outputs the receiving correlation value of a desired signal corresponding to a specific channel, and a pilot extractor unit 305 extracts the receiving correlation value of a pilot signal being a known signal. A power composer unit 291 performs the power composition of the extracted receiving correlation values, and generates the sample value of a desired signal power. A sample value here is the sum of n values obtained by squaring n receiving correlation values.

Figure 22:
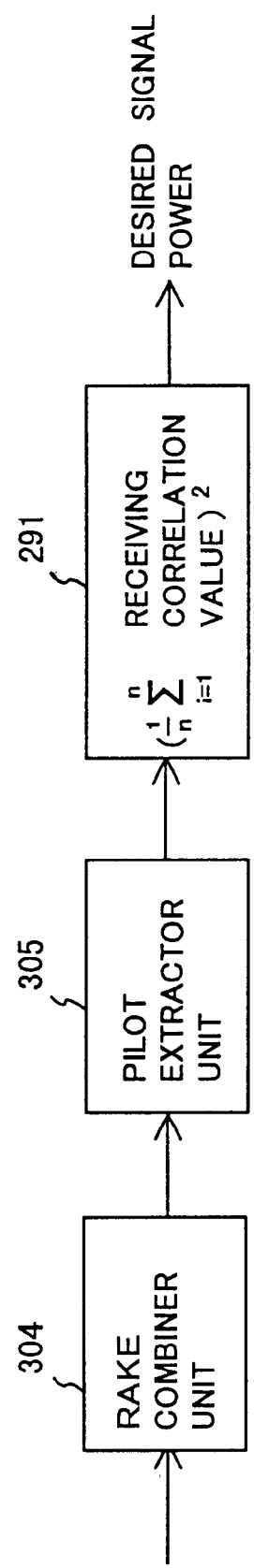
FIG. 22 shows the second power composition.

In FIG. 22, the power composer unit 291 performs the amplitude composition of the extracted receiving correlation values, and generates the sample value of a desired signal power. A sample value here is obtained by squaring the average value of n receiving correlation values.

Figure 23:
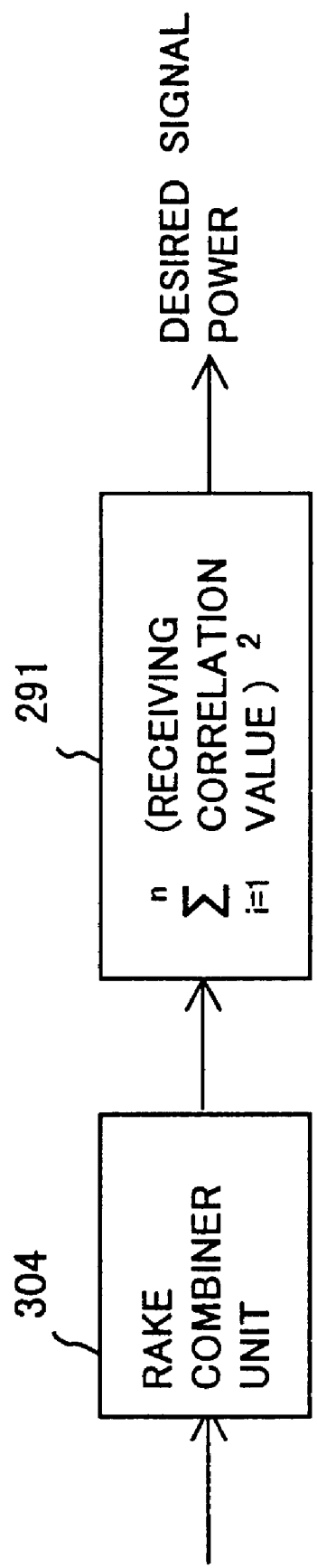
FIG. 23 shows the third power composition.

In FIG. 23, the extraction of a pilot signal is not performed. The power composer unit 291 performs the power composition of receiving correlation values of a pilot signal and data signals outputted from the rake combiner unit 304, and generates the sample value of a desired signal power. A sample value here is the sum of n values obtained by squaring n receiving correlation values. The method shown in FIG. 23 can be applied to an arbitrary signal regardless of whether or not there is a pilot signal.

FIG. 24 shows a configuration example of the power composer unit 291 shown in FIG. 23. The configuration of FIG. 24 comprises a square generator 311, an adder 312 and a latch circuit 313. The square generator 311 squares an inputted receiving correlation value. The adder 312 and latch circuit 313 integrate the n consecutive outputs from the square generators 311, and output the result of the integration as a sample value. The latch circuit 313 is cleared for each one sample time by a sampling signal. The power composer unit 291 shown in FIG. 23 comprises the same circuits as shown in FIG. 24.

Figure 25:
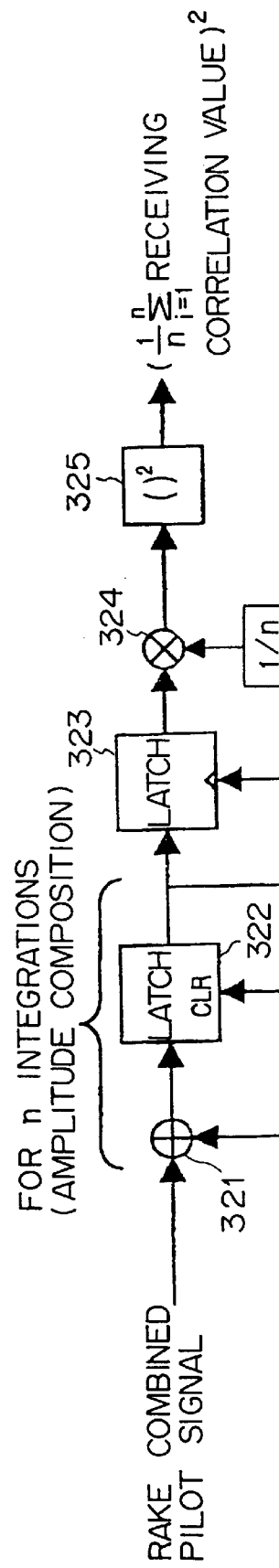
FIG. 25 shows the second configuration example of the power composer unit.

FIG. 25 shows a configuration example of the power composer unit 291 shown in FIG. 22. The configuration of FIG. 25 comprises an adder 321, latch circuits 322 and 323, a multiplier 324 and a square generator 325.

The adder 321 and the latch circuit 322 integrate n consecutive receiving correlation values, and the latch circuit 322 is cleared for each one sample time by a sampling signal. The latch circuit 323 latches the output of the latch circuit 322 for each one sample time according to a sampling signal, and the multiplier 324 multiplies the output of the latch circuit 323 by 1/n. The square generator 325 squares the output of the multiplier 324, and outputs the result of the calculation as a sample value.

A fading pitch estimation unit 292 shown in FIG. 18 adds the absolute values of the difference between two consecutive values for a certain period of time, and estimates the moving speed from the added value based on the sample value of a desired signal power generated in the same way as shown in FIG. 14. In this case, the fading pitch estimation unit 292, for example, comprises the same circuits as shown in FIG. 15.

The higher the moving speed is, the greater this added value becomes, since the higher the moving speed is, the more rapidly the desired signal power increases or decreases. The lower the moving speed is, the smaller this added value becomes, since the lower the moving speed is, the more slowly the desired signal power increases or decreases. Accordingly, a moving speed can be estimated at a plurality of stages by dividing the range of the sum of the differences between sample values. A moving speed can also be represented as an appropriate function of the sum.

Alternatively, when adding differences between sample values for a certain period of time, the moving average of these values can be measured, and a moving speed can be estimated from the average value. More precise fluctuation of the moving speed can be estimated by measuring the moving average accurately.

Figure 26:
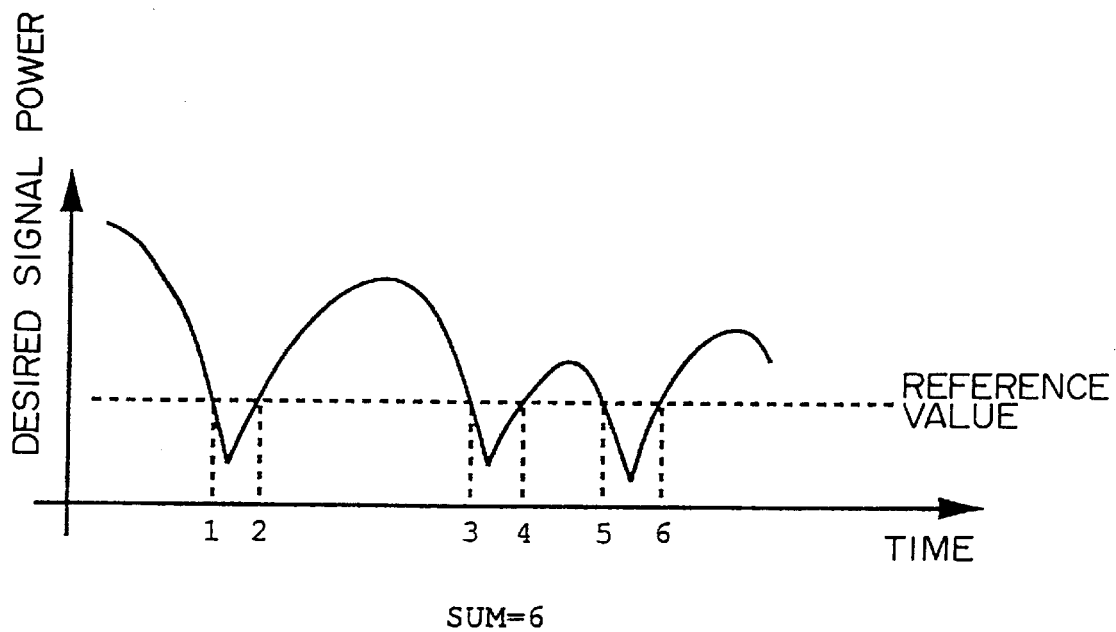
FIG. 26 shows the reference values of desired signal powers.

As shown in FIG. 26, by making the fading pitch estimation unit 292 count the frequency of the cases where the sample values of a desired signal power cross a certain reference value, the moving speed can also be estimated from the count value (SUM). The higher the moving speed is, the greater the count value becomes. The lower the moving speed is, the smaller the count value becomes. Accordingly, a moving speed can be estimated using this count value in the same way as the above-mentioned differences between sample values are added. In this case, the fading pitch estimation unit 292 comprises, for example, the same circuits as shown in FIG. 17.

By measuring the moving average of count values for a certain period of time when counting the crossing frequency, a moving speed can also be estimated from the average. More precise fluctuation of the moving speed can be estimated by measuring the moving average accurately.

Although both estimation methods using a TPC command and a desired signal power are described above, there is a certain correlation between the results of these two methods. Generally speaking, since the transmission power cannot be controlled by a TPC command, if the moving speed exceeds a certain level, the rate of the change of the TPC command generated on the receiving side becomes constant.

Figure 27:
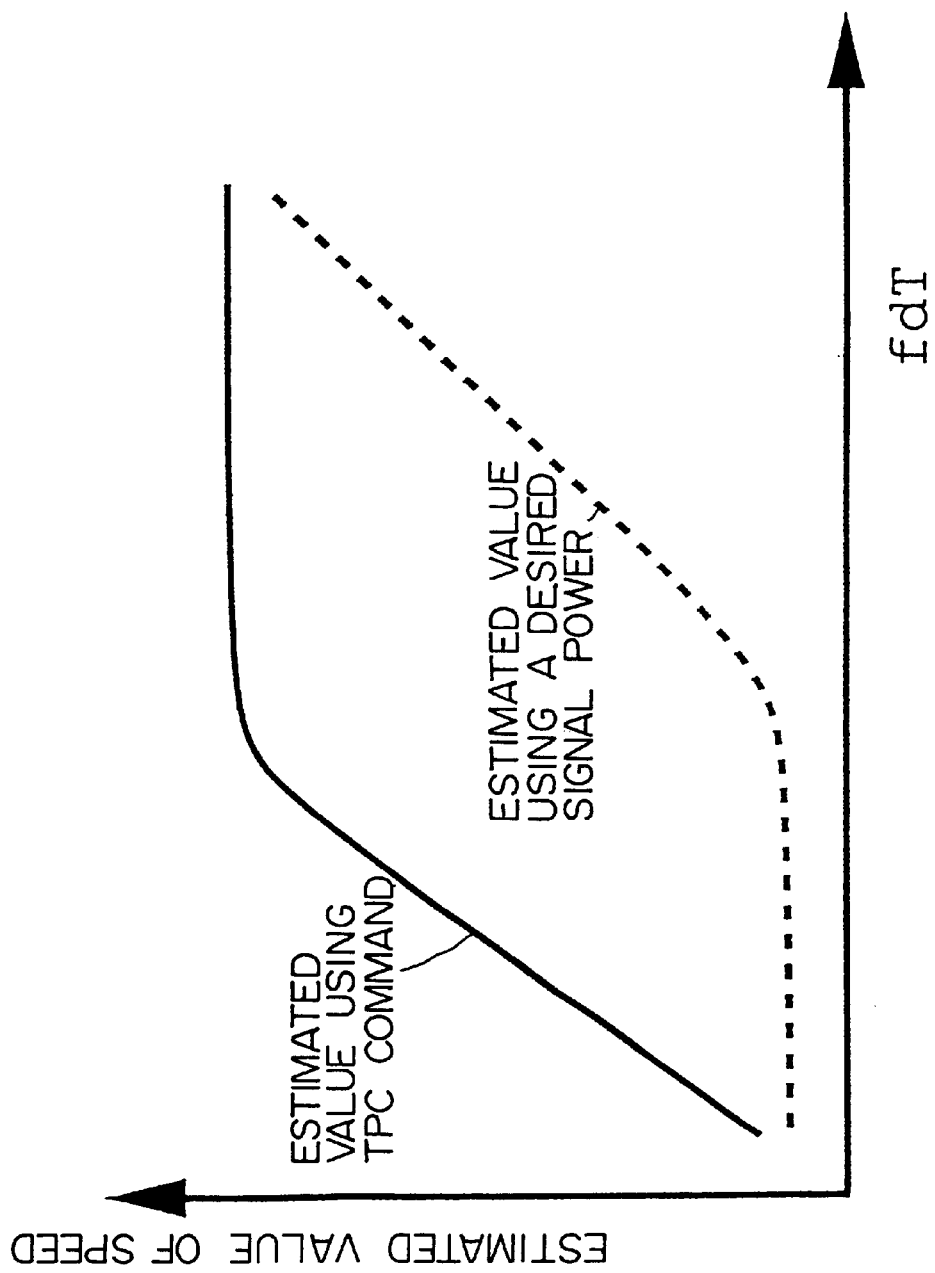
FIG. 27 shows the relationship between two estimation methods.

For this reason, in a method using a TPC command, the estimated speed obtained based on this rate of change indicates a constant value in a high speed area beyond a certain level as shown in FIG. 27. FIG. 27 shows the relationship between the fading pitch (fdT) of a generated fading and the estimated speed. There is a close relationship between a fading pitch and an actual moving speed. The greater the fading pitch becomes, the higher the moving speed becomes.

On the other hand, in a method using a desired signal power, the estimated speed indicates a constant value in a low speed area below a certain level, the converse of the method using a TPC command. This is because when the moving speed is low, the value of a desired signal power becomes constant by the effective transmission power control of a TPC command. If the moving speed becomes high to some extent, the transmission power control becomes ineffective, and the desired signal power fluctuates. Accordingly, the moving speed can be estimated using the fluctuation.

Therefore, it is desirable to estimate a moving speed using these estimation methods simultaneously. For example, it is sufficient only if in an area where the estimated value obtained by a TPC command is saturated that an estimated value obtained by a desired signal power is adopted, and in an area where the estimated value obtained by a desired signal power is saturated, that an estimated value obtained by a TPC command is adopted. By using the two methods simultaneously, the shortcomings of both methods can be overcome, and thereby the estimation range of a moving speed can be expanded.

For example, as shown in FIG. 28, the moving speed of a mobile station can be estimated in a plurality of speed ranges by the above-mentioned fading pitch estimation units 231, 262 and 292, and each of the fading pitch estimation units can output a control signal corresponding to the respective speed range.

In FIG. 28, an estimated speed is divided into five speed ranges of A (stationary state), B (0 to 40 km/h), C (40 to 80 km/h), D (80 to 120 km/h) and E (over 120 km/h), and a different control signal is outputted according to the speed range to which an estimated speed belongs.

According to this control signal, the value of the respective parameter of a searcher, transmission power control unit, and phase estimation unit in the case of coherent detection, etc. can be optimized against the generated fading.

In the above-mentioned embodiments, an arbitrary hardware or firmware such as a digital signal processor (DSP) can be used for a circuit for estimating a moving speed and circuits for setting a variety of parameters of a communication apparatus. The target parameters for control are not limited to a searcher function, transmission power control function and coherent detection function, but can include any other functions.

Furthermore, the present invention is not limited to the communications in a DS-CDMA system, but can also be widely applied to the communications of a phase shift keying (PSK) system, a personal digital cellular (PDC) system, etc.

According to the present invention, in mobile communications of a CDMA system, etc. the moving speed of a mobile station can be estimated by utilizing a transmission power control function and a despread function. A variety of parameters of a communication apparatus can also be dynamically controlled according to an estimated speed, and thereby the receiving characteristic and the channel capacity can be improved.

What is claimed is:

1. An apparatus for estimating speed in mobile communications for controlling transmission power between a transmitting station and a receiving station, comprising:

an inputting unit inputting a transmission power control command transmitted from said receiving station to said transmitting station; and a speed estimating unit estimating a moving speed of said receiving station using said transmission power control command and outputting a control signal corresponding to the estimated moving speed, wherein said speed estimating unit detects the number of the cases where the same value of said transmission power control command continues for a predetermined number of times and estimates said moving speed based on the number of the cases.

2. The apparatus for estimating speed according to claim 1, wherein said speed estimating unit estimates a relative moving speed to said transmitting station of said receiving station.

3. The apparatus for estimating speed according to claim 1, wherein said speed estimating unit detects a change of values of said transmission power control command inputted consecutively and estimates said moving speed based on the change of the values.

4. The apparatus for estimating speed according to claim 1, wherein said speed estimating unit sets said predetermined number according to a transmission frequency of said transmission power control command.

5. An apparatus for estimating speed in mobile communications for controlling transmission power between a transmitting station and a receiving station, comprising:

an inputting unit inputting a transmission power control command transmitted from said receiving station to said transmitting station; and a speed estimating unit estimating a moving speed of said receiving station using said transmission power control command and outputting a control signal corresponding to the estimated moving speed, wherein said speed estimating unit samples an accumulated value of said transmission power control command at a predetermined interval, adds the differences between two consecutive sample values for a predetermined period of time and estimates said moving speed based on an obtained value.

6. The apparatus for estimating speed according to claim 5, wherein said speed estimating unit calculates a moving average of said differences between sample values and estimates said moving speed from the moving average.

7. An apparatus for estimating speed in mobile communication for controlling transmission power between a transmitting station and a receiving station, comprising:

an inputting unit inputting a transmission power control command transmitted from said receiving station to said transmitting station; and a speed estimating unit estimating a moving speed of said receiving station using said transmission power control command and outputting a control signal corresponding to the estimated moving speed, wherein said speed estimating unit counts for a predetermined period of time the number of the cases where an accumulated value of said transmission power control command crosses a reference value, and estimates said moving speed based on a count value.

8. The apparatus for estimating speed according to claim 7, wherein said speed estimating unit calculates said count value using as moving average method.

9. An apparatus for estimating speed in mobile communications between a transmitting station and a receiving station, comprising:

a receiving unit extracting a desired signal from a received signal;

a power composing unit generating a desired signal power from said desired signal; and a speed estimating unit estimating a moving speed of said transmitting station using said desired signal power and outputting a control signal corresponding to the estimated moving speed, wherein said speed estimating unit samples said desired signal power at a predetermined interval, adds the differences between two consecutive sample values for a predetermined period of time and estimates the moving speed based on an obtained value.

10. The apparatus for estimating speed according to claim 9, wherein said speed estimating unit estimates a relative moving speed to said receiving station of said transmitting station.

11. The apparatus for estimating speed according to claim 9, wherein said receiving unit includes a demodulating unit extracting said desired signal by despreading said received signal.

12. The apparatus for estimating speed according to claim 9, wherein said speed estimating unit calculates a moving average of said differences between sample values and estimates said moving speed from the moving average.

13. An apparatus for estimating speed in mobile communications between a transmitting station and a receiving station, comprising:

a receiving unit extracting a desired signal from a received signal;

a power composing unit generating a desired signal power from said desired signal; and a speed estimating unit a moving speed of said transmitting station using said desired signal power and outputting a control signal corresponding to the estimated moving speed, wherein said speed estimating unit samples said desired signal power at a predetermined interval, counts for a predetermined period of time the number of the cases where a sample value crosses a reference value, and estimates said moving speed based on a count value.

14. The apparatus for estimating speed according to claim 13, wherein said speed estimating unit calculates said count value using a moving average method.

15. An apparatus for estimating speed in mobile communications for controlling transmission power, comprising:

a first speed estimating unit estimating a moving speed of an opposing station using a transmission power control command transmitted from the opposing station and outputting a first estimation result;

a receiving unit extracting a desired signal from a received signal;

a power composing unit generating a desired signal power from said desired signal;

a second speed estimating unit estimating the moving speed of said opposing station using said desired signal power and outputting a second estimation result; and an adopting unit adopting the first estimation result when the estimated speed obtained by said second speed estimating unit is saturated and adopting the second estimation result when the estimated speed obtained by said first speed estimating unit is saturated.

16. A transmitter, comprising:

an inputting unit inputting a transmission power control command transmitted from a receiving station to a transmitting station in mobile communications; and a speed estimating unit estimating a moving speed of said receiving station using said transmission power control command and outputting a control signal corresponding to the estimated moving speed, wherein said speed estimating unit detects the number of the cases where the same value of said transmission power control command continues for a predetermined number of times and estimates said moving speed based on the number of the cases.

17. A receiver, comprising:

a receiving unit extracting a desired signal from a received signal in mobile communications;

a power composing unit generating a desired signal power from said desired signal; and a speed estimating unit estimating a moving speed of a transmitting station using said desired signal power and outputting a control signal corresponding to the estimated moving speed, wherein said speed estimating unit samples said desired signal power at a predetermined interval, adds the differences between two consecutive sample values for a predetermined period of time and estimates said moving speed based on an obtained value.

18. A method for estimating speed, comprising:

performing mobile communications between a transmitting station and receiving station;

transmitting a transmission power control command from said receiving station to said transmitting station;

detecting the number of the cases where the same value of the transmission power control command continues for a predetermined number of times; and estimating a moving speed of the receiving station based on the number of the cases.

19. A method for estimating speed, comprising:

performing mobile communications between a transmitting station and receiving station;

generating a desired signal power from a received signal at said receiving station;

sampling said desired signal power at a predetermined interval;

adding the differences between two consecutive sample values for a predetermined period of time; and estimating a moving speed of said transmitting stains based on an obtained value.

* * * * *